UNITED STATES PATENT OFFICE.

WALTER SCHOPPER, OF FRANKFORT-ON-THE-MAIN, GERMANY.

METHOD FOR THE TREATMENT OF SAL-AMMONIAC SKIMMINGS.

1,403,060.     Specification of Letters Patent.     Patented Jan. 10, 1922.

No Drawing.     Application filed July 9, 1920. Serial No. 395,124.

*To all whom it may concern:*

Be it known that I, WALTER SCHOPPER, a citizen of the German Republic, residing at 45 Bockenheimer Anlage, Frankfort-on-the-Main, have invented certain new and useful Improvements in Methods for the Treatment of Sal-Ammoniac Skimmings, (for which I have filed an application in Germany on Feb. 28, 1918,) of which the following is a specification.

My invention relates to the treatment of salammoniac skimmings, and the object of the invention is to provide a method of treating salammoniac skimmings whereby a greater percentage of certain of the ingredients or contents of the skimmings in useful form can be separated therefrom in an efficient manner and in a purer state than has heretofore been possible.

It is known that the so-called salammoniac skimmings—consisting of a mixture of zinc grains, oxide of zinc, zinc chloride, ammonium chloride, and oxy-chlorides of zinc and ammonia—can be treated by mixing them with lime or other suitable alkali earth metal oxides, such for example as burnt dolomite, and by heating the mixture in a kettle or furnace. In doing so ammonia is expelled as a gas and a residue is obtained containing chloride of calcium, that can be leached out, oxide of zinc and zinc grains.

Experiments have demonstrated that when applying this known method a greater or less part of ammonia is always retained in the residue. The ammonia remaining in the residue not only constitutes a loss in and of itself, but its presence in the residue results in a further disadvantage and loss due to the formation of compounds of ammonia and zinc, soluble in water, which dissolve when the chloride of calcium is leached; so that these compounds not only pollute the solution of chloride of calcium, but also cause losses of zinc. Besides a dechloridization to 1 % or less cannot be obtained by the known treatment of the skimmings; the residue obtained in this manner actually containing 5% to 6% of chlorine.

My invention consists in the method of treating salammoniac skimmings which is hereinafter described in accordance with the preferred manner of carrying out the same, and the invention is more particularly set forth in the appended claims.

According to the present invention, it is possible to eliminate ammonia from the residue and obtain a dechloridization to 1% of chlorine by using live steam for heating the mixture of the salammoniac skimmings and lime.

For heating salammoniac skimmings according to the preferred form of the present invention, a crumbly consistency of the material is advantageous. In order to obtain this crumbly consistency, the ground skimmings are, for instance, mixed with the necessary quantity of lime, preferably dry slaked lime of the usual powdered form such as is used in the manufacture of bleaching powder, and then moistened with a certain quantity of water, about 15% by weight as compared with the skimmings and lime, i. e., enough water to produce a moist crumbly consistency. The skimmings prepared in this manner are put into an iron vessel provided with a sieve bottom, under which live steam at a pressure of about 1.5 atm. (110° C.) is introduced, so that the steam is passed through the mixture. In this way the steam in passing through the mixture comes into intimate contact with the particles of the mixture. Immediately, ammonia gas is developed actively, and this gas can either be condensed to ammonia water in the usual manner, or it can be used for producing sulphate of ammonia. The residue remaining on the sieve bottom contains all of the chlorine of the skimmings in the form of chloride of calcium, whereas the zinc has been converted to zinc oxide. This residue is then leached with water according to any of the well known ways, to separate and recover the chlorine, and the residue is—after having been dried—a valuable material for zinc smelting works.

While I have described my invention with particularity according to the preferred manner of practicing the same, it will be obvious to those skilled in the art, after understanding the invention, that certain changes may be made in my preferred method without departing from the spirit or scope of the invention, and I aim in the appended claims to cover all such changes and modifications.

What I claim is:

1. A method for the treatment of salammoniac skimmings by heating the skimmings mixed with lime, which method is characterized by making the mixture of crumbly consistency and passing steam into the mixture to heat same.

2. The method of treating salammoniac skimmings which comprises making a mixture of the skimmings and lime and heating the same by passing live steam into the mixture.

3. The method of treating salammoniac skimmings mixed with an alkali earth metal oxide, which consists in passing live steam through the mixture.

4. The method of treating salammoniac skimmings which consists in forming an intimate mixture of said skimmings and powdered lime, having the mixture of crumbly consistency, and passing live steam into the mixture.

5. The method of treating salammoniac skimmings mixed with a powdered alkali earth metal oxide, the mixture being of crumbly consistency, and recovering certain ingredients thereof, which consists in passing live steam into the mixture to drive off the ammonia, catching the ammonia thus separated, and then leaching the residue with water to separate the chlorine and calcium from the remaining residue.

6. Method of treating salammoniac skimmings which consists in forming an intimate mixture of the ground skimmings and lime, moistening the mixture, passing live steam into the mixture so as to drive off therefrom substantially all of the ammonia leaving substantially all of the zinc in the residue in the form of zinc oxide and substantially all of the chlorine in the form of chloride of calcium, then extracting substantially all of the chlorine and calcium from the remaining residue by leaching with water.

In testimony whereof I affix my signature in presence of two witnesses.

WALTER SCHOPPER.

Witnesses:
ROBERT ENGLER,
LUDWIG SCHMIDTMER.